FIG.2

Dec. 19, 1967  R. W. STUART  3,358,732
APPARATUS FOR VALVE CHECKING
Filed April 30, 1965  5 Sheets—Sheet 3

FIG. 3

INVENTOR.
RICHARD W. STUART

Dec. 19, 1967  R. W. STUART  3,358,732
APPARATUS FOR VALVE CHECKING
Filed April 30, 1965  5 Sheets-Sheet 4

FIG. 4

INVENTOR.
RICHARD W. STUART

Dec. 19, 1967  R. W. STUART  3,358,732
APPARATUS FOR VALVE CHECKING
Filed April 30, 1965  5 Sheets-Sheet 5

INVENTOR.
RICHARD W. STUART

United States Patent Office 3,358,732
Patented Dec. 19, 1967

3,358,732
APPARATUS FOR VALVE CHECKING
Richard W. Stuart, Cleveland, Ohio, assignor to The North American Manufacturing Company, Cleveland, Ohio, a corporation of Ohio
Filed Apr. 30, 1965, Ser. No. 452,100
36 Claims. (Cl. 158—11)

This invention relates to improvement in an apparatus for valve checking, and more particularly to means for detecting defective operation or leakage in a valve or valves.

One of the objects of the present invention is to provide apparatus for valve checking for detecting, as a defect, a leak in a valve, improper closing and/or opening of the valve or valves, leakage, etc.

A further object of the present invention is to provide a valve checker for checking the operation of any fluid controlling valve, such as in a water line, brewery line, processing flow line, fuel line, etc.

A further object of the present invention is to provide an apparatus including valve checking means and fire control means combined so that the valve checking means checks the operation of the fuel valve controlled by the fire control means.

A further object of the present invention is to provide such apparatus wherein all components "fail safe" and will also "fail safe" upon an electric power failure thereto.

A further object of the present invention is to provide such apparatus wherein the fire control means is capable of operating on either gas or oil as a fuel and the valve checking means checks only the gas fuel valve but not the oil fuel valve.

A further object of the present invention is to provide such apparatus wherein the mode of operation of the fire control means (including any safety cut off device, prepurging means and/or postpurging means therein) and of the valve checking means are compatible in operation.

A further object of the present invention is to provide a valve checking means easily connectible to the existing fire control means and readily adaptable to presently designed fire control means.

A further object of the present invention is to provide an apparatus, including a valve checking means, characterized by its inexpensive manufacturing cost, ease of assembly of its component parts, low operating cost, structural simplicity, compactness, strong and sturdy nature, operating efficiency, ease of operation or use, multiplicity of functional advantages for many component parts, operating economy, etc.

These and other objects of the present invention will become more fully apparent by reference to the appended claims as the following detailed description proceeds in reference to the accompanying drawings wherein:

FIG. 7 is a modification of FIG. 3 permitting change in the phase relationship of the valve checking and combustion cycles.

Valve checking means J is usable to check for defects in operation in any fluid controlling valve, such as a valve in a water line, brewery flow line, processing flow line, fuel line, etc. The defect detected is generally a leak in the closed valve but this means J will detect failures to open and/or close some of the valves. Leak detection is especially important in fuel lines, where a leak might cause an explosion; and in processing flow lines, where a leak would adversely affect accurate batch measurements required.

Valve checking means J can broadly function in any suitable manner by any suitable mechanism, such as hydraulic, mechanical, electrical, and/or electro-mechanical. Only one form is shown for purposes of illustration herein.

Figure 2:
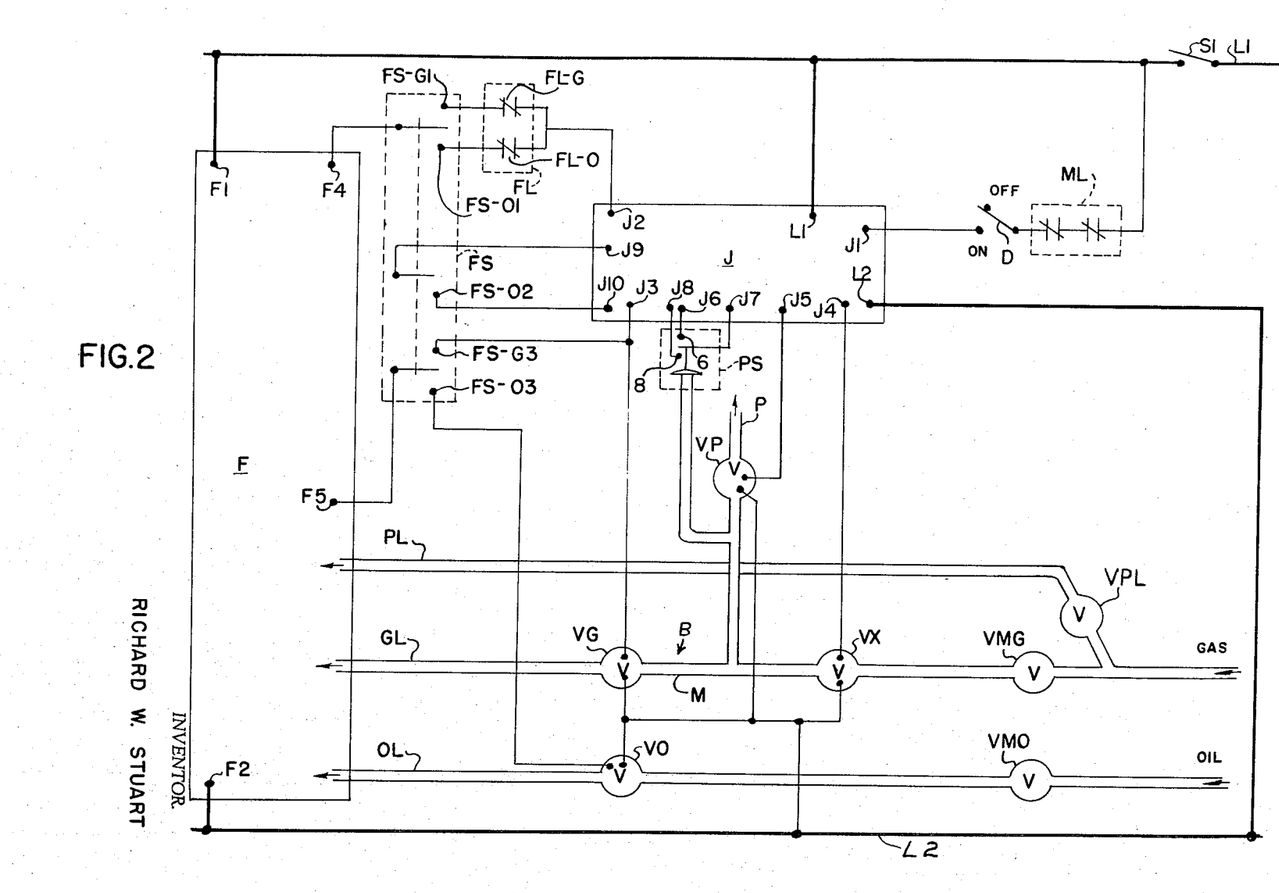
FIG. 2 is a schematic electrical, fluid flow, etc. layout of the valve checking means J, fire unit F, a portion of burner unit B, and the electrical and other connections therebetween.
Figure 3:
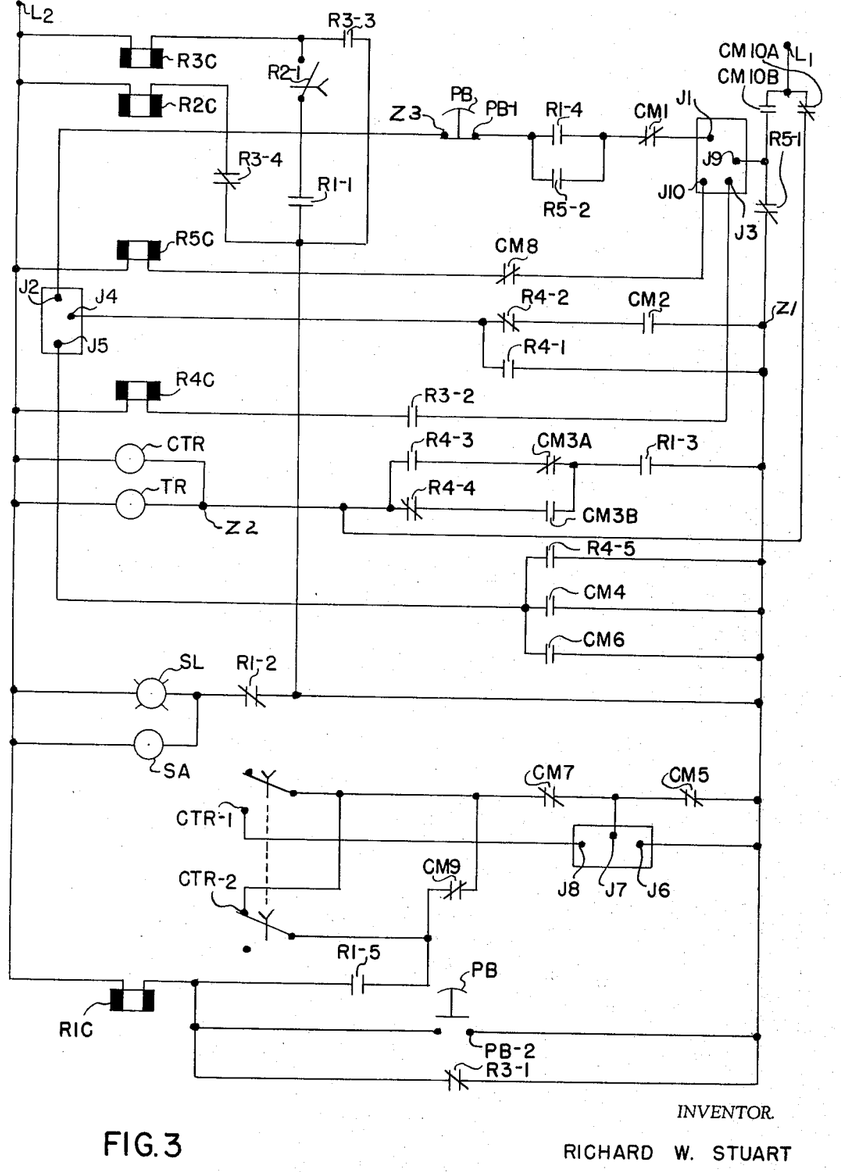
FIG. 3 is an electrical diagram of valve checking means J.
Figure 4:
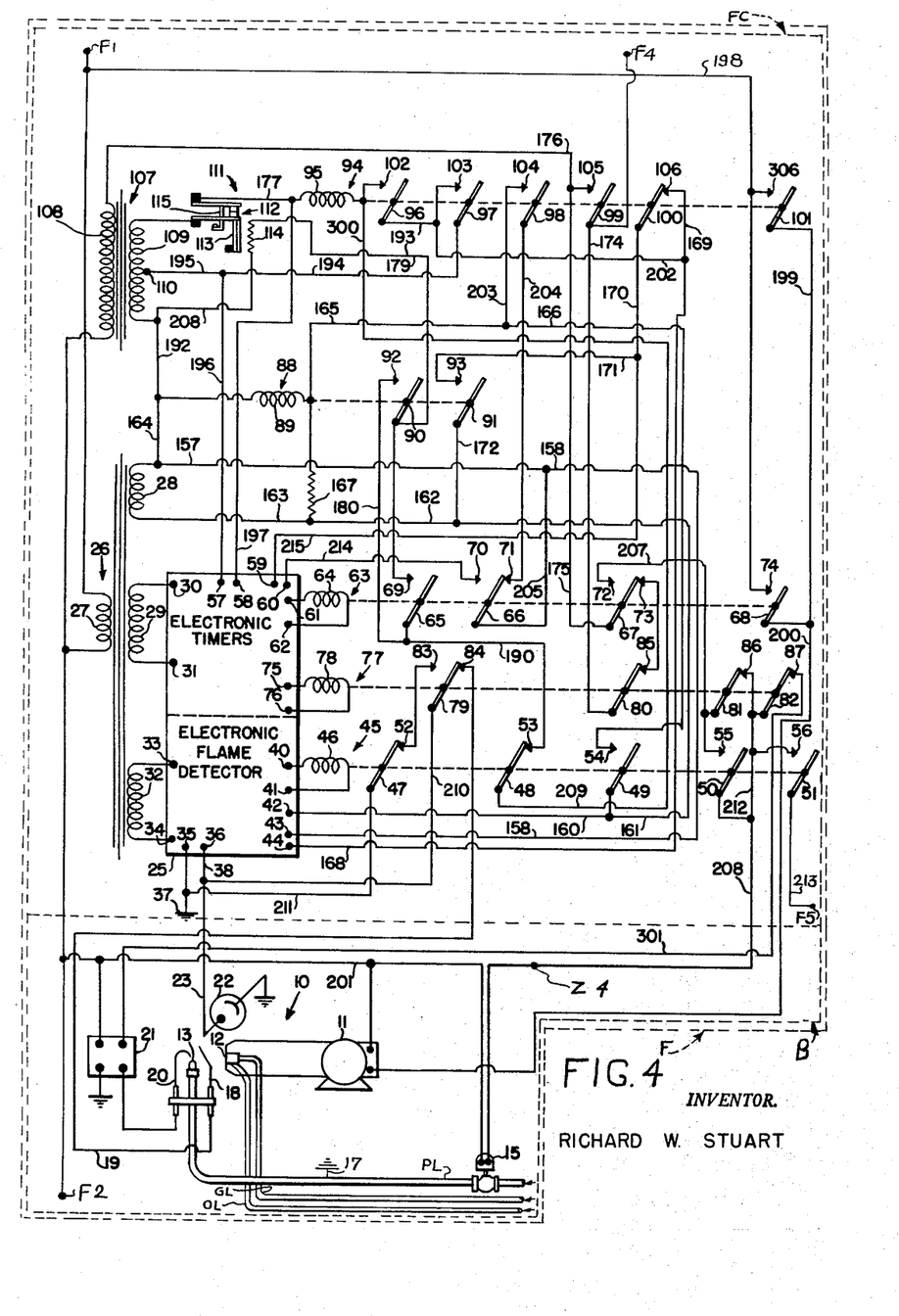
FIG. 4 is a diagram of fire unit F, including fire control means FC and the remainder of burner unit B.

The structure shown in the drawings herein is especially intended for use as part of an apparatus for a boiler using any conventional fire control means FC in FIG. 4, any conventional burner or combustion unit B in FIGS. 2 and 4, and valve checking means J in FIGS. 2 and 3.

This structure will be broadly explained by reference now to FIGS. 2 and 4. The apparatus is capable of operating on either gas or oil as a fuel flowing inwardly from the right toward the left through respectively gas line GL and oil line OL from FIG. 2 to FIG. 4. Flow is controlled by a valve means including a plurality of valves comprising, gas upstream valve VX in FIG. 2; gas downstream valve VG connected to the opposite end of a conduit or manifold M from valve VX to control in series flow therethrough; gas vent valve VP connected in fluid communication with conduit or manifold M between upstream and downstream valves VX and VG for selectively sealing or venting this conduit for exhaust through vent port P of vent valve VP; oil valve VO; manually operated main gas line, oil line and pilot line shut off valves VMG, VMO and VPL; and pilot valve 15 in FIG. 4. Valve VG is an automatic, safety shut-off valve, and valve VX is an automatic, motor-driven, reset valve or safety shut-off valve. Valve VP in FIG. 2 is open when deenergized and closed when energized; valves VG, VO and VX in FIG. 2 and valve 15 in FIG. 4 are closed when deenergized and open when energized; and each of these valves is an electrically actuated, solenoid or motor-driven valve of a conventional type. Vent valve VP is a normally open, fully ported, electrically operated vent valve. Oil valve VO either may be a valve controlling oil flow from a storage head through oil line OL to burner 12 or may be an electrically driven pump, since this valve is not checked by valve checking means J.

Electrical components are shown in the upper portion of FIG. 2. These include miscellaneous limits (boiler limits) ML; demand switch D taking the form of a pressure switch, manually actuatable switch or thermostat actuated switch; and fuel selector switch FS adapted to close simultaneously all selection contacts for one fuel, either oil contacts designated by O or gas contacts designated by G. Contacts FS–G3 and O3, by signal from the fire control unit F, open and close main gas valve VG or main oil valve VO and provide suitable signal at terminal J3 to valve checking means J; contacts FS–O2, when closed, tells valve checking means J that oil has been selected; and contacts FS–O1 and FS–G1 selectively bring into the circuit the fuel sensitive limits FL–O for oil or limits FL–G for gas in fuel sensitive limit switch FL. This fuel selector switch FS is a three pole, double throw, center-off switch.

FIG. 4 illustrates fire control means FC and a portion of the burner unit B in fire unit F. This FIG. 4 is a slightly modified copy of FIG. 1 from U.S. Patent No. 2,751,972, granted June 26, 1956, to J. A. Loeber, and entitled "Burner Safety Control Apparatus," suitably modified to fit into the present application. A brief comparison of FIG. 4 of the present application with FIG. 1 of said Loeber patent will reveal that the modification of this FIG. 1 has taken place at the bottom, top, upper left and lower right of FIG. 1 of said Loeber patent. Electrical lines and reference numerals 173 and 213 have been respectively completely and partially deleted from FIG. 1. Ground 17 has been relocated for convenience. The present application has the following component parts corresponding with those in FIG. 1: terminal F2 and line L2 in present FIGS. 4 and 2 with line 155 in FIG. 1 of said patent; terminal F1 and line L1 in FIGS. 4 and 2 with line 156; miscellaneous limits ML in FIG. 2 with limit control 116; demand switch D in FIG. 2 of the present application with switch 117; master switch S1 in FIG. 2 with the master switch in Loeber; gas valve VG with gas valve 14. Since the mode of operation of FIG. 4 is substantially the same as that in the Loeber patent, the Loeber patent is being incorporated herein by reference thereto, and there will be frequent references hereafter to portions in the Loeber patent whenever they apply.

However, it will be readily apparent hereinafter that valve checking means J may be used with any suitable fire control means or burner unit and is not restricted to the disclosure in the Loeber patent. Loeber has been used only for purposes of illustration since it illustrates a fairly complete, typical, more complex fire control and burner unit. It should be understood that it is possible to use only one or only some of the illustrated features of the Loeber patent, if you want to do so. It is not necessary to use all of the features therein. Valve checking means J is usable with the simplest as well as the most complex fire control means because the complete mode of operation of valve checking means J is controlled by the signals from the fire control means FC opening and closing main gas valve VG.

Miscellaneous limits ML and fuel sensitive limits FL in FIG. 2 are conventional burner controls. Miscellaneous limits ML are limits required to safely burn both fuels, oil and gas; and may include boiler or furnace pressure, temperature and water level to actuate the limits. Fuel sensitive limits FL has limits peculiar to the different fuels burned—gas pressure and ambient temperature may actuate the gas limits; oil pressure, oil temperature and atomizing air pressure may actuate the oil limits.

FIGS. 2 and 4 include some components that will be frequently mentioned hereinafter. They have a fuel burner 12, fuel supply conduits GL and OL supplying gas fuel and oil fuel to burner 12, gas control valve VG and oil control valve VO as burner valves controlling fuel flow through these conduits to the burner for operating the burner through a burning cycle, fire control means FC for controlling the operation of burner 12 by valves VG and VO, and blower 11 causing a prepurge and a postpurge in the burning zone of burner 12. Valve checking means J is shown in more detail in FIGS. 3, 5 and 6. This valve checking means is operable to detect the defect in the operation of gas valves VG, VX, and VP while the valves are in their flow controlling position shown in FIG. 2. It is not necessary to disassemble any valve from the flow line to check its mode of operation.

Figure 1:
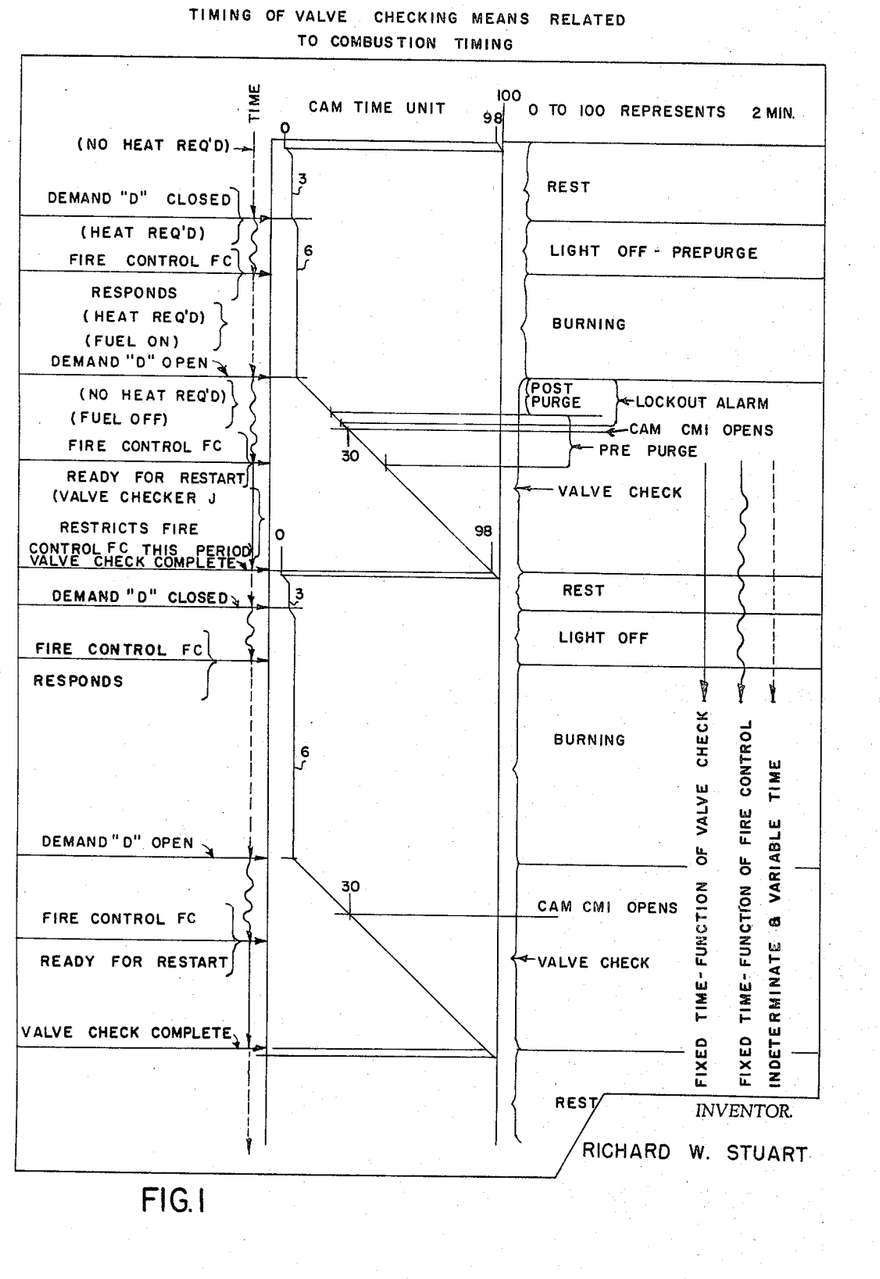
FIG. 1 is a time diagram showing the timing of the valve checking means related to combustion timing.

FIG. 1 shows the time relationship between valve checking and combustion through two cycles of each to present a good introduction to the operation of the disclosed apparatus. The description is made with respect to "100" cam timer time units (the time for valve checking means J) representing two minutes of time, as an example, but it should be readily apparent that any suitable time can be used. This sequence occurs: (1) From time "0"–"3" (timer time units of valve checking means J), both valve checking means J and fire control means FC are at rest; (2) after demand switch D is closed at time "3" to indicate that heat is required, fire control means FC responds, fuel is burnt at burner 12 in FIG. 4 to provide the requested heat, and valve checking means J moves from time "3" to "6"; (3) when demand switch D is opened at time "6" to indicate that no more heat is required, fire control means FC turns off burner 12 to discontinue heat, fire control means FC starts a postpurge action, and valve checking begins; (4) from time "6" to "98," valve checking occurs by valve checking means J, and fire control means FC is restricted from restarting during this period but gets ready for a restart; and (5) then the valve checking means J rapidly travels from time "98" back to time "3" to await the next closing of demand switch D at time "3." The rest of this description will be directed to a detailed explanation of this mode of operation.

FIGS. 2, 3 and 4 show the system at rest with all components shown as being deenergized with power off. All circuits are depowered and no demand for heat is occurring. Cam contacts CM1, CM2, CM3A, CM3B, CM4, CM5, CM6, CM7, CM8, CM9, CM10A and CM10B are actuated by synchronously driven cams driven by an electric motor in cam timer TR and are shown at their time "0" or normal position; and check timer contacts CTR–1 and CTR–2 are actuated by check timer CTR and are shown in their unactuated position occupied from time "3" to "36." Relay coils R1C, R2C, R3C, R4C and R5C in FIG. 2 respectively control and actuate the relay contacts having the same first two reference numerals. For example, relay coil R1C actuates relay contacts R1–1, R1–2, etc. Also, push buttons PB in FIG. 2 are a single push button PB rigidly connecting and carrying push button contacts PB–1 and PB–2.

Before starting the description, these additional general comments can be made. Cams CM10A and CM10B simulate a power failure to reestablish the original circuits and to reset them to their original condition in valve checking means J. Also, relay coil R1C is not latched in but is electrically connected to provide a true failure system. It is a cocked trigger ready to shut down the apparatus and to give a suitable alarm, either audible or visual.

The description will start with the apparatus at rest, with no heat demand, but with the set up of the starting circuits to provide power to not only valve checking means J but also fire control means FC.

Power is supplied to valve checking means J in FIGS. 2 and 3 at time "0." Closing main switch S1 energizes cam timer TR and check timer CTR by forming CIRCUIT NO. C1 from line L1 in FIGS. 2 and 3 through cam contact CM10A in FIG. 3 now closed, cam timer TR and check timer CTR in parallel, and line T2 in FIGS. 3 and 2.

At time "3," numerous circuits are formed and broken.

At time "3," opening cam contact CM10A then breaks CIRCUIT NO. C1 to deenergize cam time TR and check timer CTR. This deenergizing action causes check timer CTR contacts CTR–1 and CTR–2 to reset and to assume the position shown in FIGS. 3 and 5 if they had been in the opposite position (see FIG. 5) from the preceding valve checking cycle. However, this is a 30 unit check timer—from time "3" to "6," it will make a false start, and at time "6," it will begin to properly time out its 30 time units, as will be brought out in more detail hereinafter.

At time "3," closing cam contact CM10B performs several operations, including: (1) momentarily energizing failure signal light SL to cause it to flick on now to show that it is operating properly by forming CIRCUIT NO. C3 from line L1 in FIG. 3 through cam contact CM10B normally open but now closed at time "3," normally closed relay contact R5–1 of relay coil R5C, normally closed relay contact R1–2 of oil relay coil R1C, failure visual signal lamp SL and audible signal alarm SA, and line L2; (2) energizing system failure relay coil R1C by forming CIRCUIT NO. C5 from line L1 in FIG. 3 through normally open cam contact CM10B closed at time "3," normally closed relay contact R5–1 of relay coil R5C, normally closed relay contact R3–1 of relay coil R3C, system failure relay coil R1C, and line L2; and (3) energizing delay coil R2C by forming CIRCUIT NO. C7 from L1 in FIG. 3 through cam contact CM10B normally open but now closed at time "3," normally closed relay contact R5–1 of relay coil R5C, normally closed relay contact R3–4 of relay coil R3C, delay relay coil R2C and line L2. Energizing system failure relay coil R1C: (1) opens normally closed relay contact R1–2 of relay coil R1C to break Circuit No. C3 to deenergize and turn off failure signal lamp SL and signal alarm SA; and (2) closes normally open relay contact R1–5 of relay coil R1C to hold energized system failure relay coil R1C by forming HOLDING CIRCUIT C11 from Line L1 in FIG. 3 through cam contact CM10B normally open but now closed at time "3," normally closed relay contact R5–1 of relay coil R5C, cam contacts CM5 and CM7 now closed, check timer contact CTR–2 closed at time "3" after Circuit No. C1 was broken, normally open relay contact R1–5 of relay coil R1C now closed by energized relay coil R1C, system failure relay coil R1C, and line L2.

After two seconds time delay, delay relay coil R2C closes the time delay relay contact R2–1 of relay coil R2C and energizes system rest relay coil R3C by forming CIRCUIT NO. C13 from line L1 in FIG. 3 through normally open cam contact CM10B now closed after time "3," normally closed relay contact R5–1 of relay coil R5C, normally open relay contact R1–1 of relay coil R1C now closed by energized relay coil R1C, normally open time delay relay contact R2–1 of relay coil R2C now closed by energized relay coil R2C, system reset relay coil R3C, and line L2. This time delay gives relay contact R1–5 of relay coil R1C enough time to stop bouncing and stay closed to firmly form Circuit Nos. C5 and C11 before relay coil R3C is energized. If this time delay were not provided, it might sometimes be necessary, if relay contact R1–5 of relay coil R1C were not closed, to push button PB to close its contact PB–2 to maintain system failure relay coil R1C energized after Circuit No. C5 is broken hereafter. Energizing system reset relay coil R3C: (1) opens normally closed relay contact R3–1 to break Circuit No. C5 but system failure relay coil R1C is still held energized by Circuit No. C11; (2) closes normally open relay contact R3–3 to hold energized system reset relay coil R3C by forming HOLDING CIRCUIT NO. C15 along the same path as Circuit No. C13 but through normally open relay contact R3–3 of relay coil R3C now closed by energized relay coil R3C instead of through relay contacts R1–1 and R2–1 of relay coils R1C and R2C; and (3) opens normally open relay contact R3–4 of relay coil R3C to break Circuit No. C7 and deenergize delay relay coil R2C. Deenergized delay relay coil R2C opens its relay contact R2–1 to break Circuit No. C13 but system reset relay coil R3C is held energized by Circuit No. C15.

Closing main switch S1 in FIG. 2 also energizes fire control means FC in FIG. 4 to standby condition. The operations now occurring are described in said Loeber patent from line 5, column 6, to line 19, column 7. The only difference is in lines 5–8, column 6, of said Loeber patent. Instead of this description, closing main switch S1 in the present application FIG. 2 energizes primary coil 27 in FIG. 4 by forming CIRCUIT NO. C17 from line L1 in FIG. 2 through fire unit terminal F1 in FIGS. 2 and 4, primary transformer winding 27 in FIG. 4, fire unit terminal F2 in FIGS. 4 and 2, and line L2 in FIG. 2.

It should be understood that FIG. 2 of said Loeber patent is incorporated in this disclosure by a reference whenever the electronic timers or electronic flame detector in present FIG. 4 is described therein.

Now, GAS CAMBUSTION CYCLE GCC occurs, and is described hereafter.

When demand switch D in FIG. 2 is closed (such as by a suitable thermostat, manually or by a pressure device responsive to the heat needs of the boiler), burner 12 in FIG. 4 provides the heat demanded and gas combustion occurs. Now, fire control means FC in FIG. 4 gives an electrical signal at terminal F5 in FIGS. 4 and 2 to gas valve VG and at terminal J3 of valve checking means J in FIG. 2 when fuel selecter switch FS is in the gas selection position with contact FS–G3 closed. Fire control means FC in FIG. 4 provides this signal after flame is proven at flame electrode 18 in FIG. 4. Then, upstream and downstream gas valves VX and VG are opened and vent valve VP is closed. The following paragraphs will describe this mode of operation in more detail.

Now, Circuit No. C19 is formed to tell the fire control means FC that it may operate. Closing demand switch D in FIG. 2 energizes primary transformer coil 108 in FIG. 4 by forming CIRCUIT NO. C19 from line L1 in FIG. 2 through miscellaneous limits ML; normally open demand switch D now closed; terminal J1 in FIGS. 2 and 3; closed cam contact CM1, normally open relay contact R1–4 of relay coil R1C now closed by energized relay coil R1C; normally closed push button PB contact PB–1; terminal J2 in FIGS. 3 and 2; gas fuel sensitive limit closed contact FL–G in fuel sensitive limit switch FL in FIG. 2; closed contact FS–G1 in fuel selector switch FS; terminal F4 in FIGS. 2 and 4; line 174 in FIG. 4; normally closed relay contact 80, 85 of relay coil 78; normally closed relay contact 73, 67 of relay coil 64; line 175; line 176; transformer primary coil 108; terminal F2 in FIGS. 4 and 2; and line L2 in FIG. 2. This Circuit No. C19 is formed in place of the circuit formed by closing switch 117 in said Loeber patent and so described in lines 20–32, column 7, of said Loeber patent.

Fire control means FC operates substantially as described in line 39, column 7, to line 11, column 10, of said Loeber patent with the difference that now, because of the alteration made in present drawing FIG. 4 to FIG. 1 of that patent: (1) the circuits described in line 7–12, column 8; lines 25–27, column 9; lines 39–49, column 9; and line 73, column 9, to line 11, column 10, of said Loeber patent go through line 198 in FIG. 4, terminal F1 in FIGS. 4 and 2, and line L1 in FIG. 2 instead of lines 198, 173 and 156 in FIG. 1 of said Loeber patent; go through terminal F2 in FIGS. 4 and 2 and line L2 in FIG. 2 instead of through line 155 in FIG. 1 of said Loeber patent; and/or go through terminal F4 in FIGS. 4 and 2 and the reverse direction along Circuit No. C19 to line L1 in FIG. 2 instead of through parts 117, 116, 173 and 156 in FIG. 1 of said Loeber patent; and (2) the circuit described in lines 68–71, column 7, and lines 34–36, column 9, follow the path of Circuit No. C19 but goes through closed contact 99, 105 instead of closed contacts 67, 73 and 80, 85.

Now, fire control means FC gives a signal at its terminal F5 in FIGS. 2 and 4 to gas valve VG in FIG. 2 and to terminal J3 in FIG. 2 after the flame has been proven at pilot flame electrode 18 in FIG. 4. See lines 68–70, column 9; and lines 30–36, column 2, of said Loeber patent explaining how flame at electrode 18 energizes relay coil 46. It will be apparent hereafter that valve checking means J includes means responsive to the demand for fuel by the signal from fire control means FC for readying valve checking means J for its valve checking cycle and for opening upstream valve VX and for closing vent valve VP with the demand for fuel by fire control means FC opening downstream valve VG.

Fire control means FC gives this signal at terminal F5 by forming CIRCUIT NO. C21 (instead of the circuit described in lines 12–23, column 10, of said patent) from line L1 in FIG. 2 along the same path as Circuit No. C19 to terminal F4 in FIG. 4 and then through normally open relay contact 99, 105 of relay coil 95 now closed by energized relay coil 95; line 175; normally open relay contact 67, 72 of relay coil 64 now closed by energized relay coil 64; line 207; normally open relay contact 55, 50 and contact 56, 51 of relay coil 46 via line 212 now closed by energized relay coil 46; line 213; terminal F5 in FIGS. 4 and 2; closed fuel selector switch contact FS–G3 in FIG. 2; through parallel circuits to line L2: (1) through gas fuel valve VG and (2) through terminal J3 in FIGS. 2 and 3, normally open relay contact R3–2 of relay coil R3C now closed by energized relay coil R3C, and fuel slave relay coil R4C. This action of forming Circuit No. C21 thus energizes fuel slave relay coil R4C and energizes and opens gas valve VG by this signal transmitted from terminal F5.

Energizing fuel slave relay coil R4C: (1) closes its relay contact R4–3 to energize cam timer TR and check timer CTR by forming CIRCUIT NO. C23 from line L1 in FIG. 3 through normally open cam contact CM10B now closed at time "3," normally closed relay contact R5–1 of relay coil R5C, normally open relay contact R1–3 of relay coil R1C now closed by energized relay coil R1C, closed cam contact CM3A, normally open relay contact R4–3 of relay coil R4C now closed by energized coil R4C, cam timer TR and check timer CTR in parallel, and line L2; (2) closes its relay contact R4–1 to energize and open upstream valve VX by forming CIRCUIT NO. C25 from line L1 in FIG. 3 through normally open cam contact CM10B closed at time "3," normally closed relay contact R5–1 of relay coil R5C, normally open relay contact R4–1 of relay coil R4C now closed by energized relay coil R4C, terminal J4 in FIGS. 3 and 2, upstream valve VX in FIG. 2, and line L2; and (3) closes its relay contact R4–5 to energize and close vent valve VP by forming CIRCUIT NO. C27 from line L1 in FIG. 3 through normally open cam contact CM10B now closed at time "3," normally closed relay contact R5–1 of relay coil R5C, normally open relay contact R4–5 of relay coil R4C now closed by energized relay coil R4C, terminal J5 in FIGS. 3 and 2, vent valve VP in FIG. 2, and line L2. Forming Circuit No. C23 causes check timer CTR to begin to time but this is a false start, and the true timing action will begin at time "6," as will be brought out in more detail hereinafter.

Now, an indefinite period of burning or combustion occurs, as shown by the dotted line in FIG. 1. The time length is solely determined by the length of time that demand switch D is closed. The action now occurring is described in line 25, column 10, to line 10, column 11, of said Loeber patent. This combustion occurs for an indefinite time period until heat demand is satisfied.

The cam timer TR and check timer CTR remain at time "6" during this combustion operation, as shown by FIG. 1. This is true because cam contact CM3A opens at time "6" to break Circuit No. C23 to deenergize cam timer TR and check timer CTR and thus reset the check timer to start it timing again when it is subsequently energized.

If combustion had gone off between time "3" and time "6," only a valve checking cycle is missed. Then, cam contact CM3A is closed and fuel slave relay coil R4C is energized by Circuit No. C21, while flame occurs, to energize cam timer TR by Circuit No. C23. Cam contact CM3A is closed to indicate the rest (time "0" to "3") and burning position, and cam contact CM3B is otherwise closed to indicate the remaining or non-burning position. If combustion goes out, fire control means FC stops emitting a signal at terminal F5 for any of the reasons given in the next paragraph and fuel slave relay coil R4C is deenergized to open its normally open relay contact R4–3 in the cam contact CM3A closed position so valve checking means J can not get to the cam contact CM3B closed position at time "6," and valve checking means J stays in this position until the next valve checking cycle is reached. However, fire control means FC can restart because Circuit No. C11 energizes system failure relay coil R1C to close its normally open contact R1–4 to form Circuit No. C19 so that an intervening burning cycle can occur.

If combustion stops, the signal provided by fire control means FC at terminal F5 is stopped so that no signal is provided to terminal J3 and to valve VG in FIG. 2. It will be apparent that valve checking means J includes means responsive to shut-off of fuel to burner 12, by the stopping of this signal to close downstream valve VG, by fire control means FC for starting the valve checking cycle by valve checking means J and for closing upstream valve VX and opening vent valve VP at the terminal end of the burning cycle and at the start of the valve checking cycle. Combustion may be stopped by any of various events, such as: (1) the heat need is satisfied and demand switch D in FIG. 2 is opened, as described in lines 47–49, column 11, of said Loeber patent by opening demand switch 117 and deenergizing main relay control coil 95; (2) the flame at burner 12 in FIG. 4 goes out, as described in lines 15–18, column 11, of said patent by deenergizing coil 46 of relay 45; or (3) the gas pressure is too low.

The safest procedure requires that the system be returned to its "off" position at the end of the combustion period by closing both main gas valves VX and VG and opening vent valve VP before starting the valve check by closing the vent valve VP, and this procedure automatically occurs here. While postpurging of the burning zone of burner 12 occurs, as described in lines 51–60, column 11, of said Loeber patent, the beginning portion of checking cycle is also occurring during this postpurging operation. Circuit No. C21 is broken to deenergize fuel slave relay coil R4C and to deenergize and close downstream gas valve VG when fire control means FC no longer emits its signal from terminal F5 because: (1) demand switch D in FIG. 2 is opened to deenergize relay coil 95 in FIG. 4 to open its normally open relay contact 99, 105, as described in line 49, column 11, of said Loeber patent; or (2) the flame has gone out to deenergize relay 45 coil 46 in FIG. 4 and open its normally open relay contacts 51, 56 and 50, 55 as described in line 18, column 11, of said Loeber patent. This ends GAS COMBUSTION CYCLE GCC.

Deenergizing fuel slave relay coil R4C: (1) opens its normally open relay contact R4–1 to break Circuit No. C25 to deenergize and close upstream valve VX; and (2) opens its normally open relay contact R4–5 to break Circuit No. C27 to deenergize and open vent valve VP.

At time "6," cam contact CM3B is closed and normally closed contact R4–4 is now closed by deenergized relay coil R4C to energize cam timer TR and check timer CTR by forming CIRCUIT NO. C29 from line L1 in FIG. 3 through cam contact CM10B now closed, normally closed relay contact R5–1 of relay coil R5C, normally open relay contact R1–3 of relay coil R1C closed by energized relay coil R1C, cam contact CM3B closed at time "6," normally closed relay contact R4–4 of relay coil R4C, cam timer TR and check timer CTR in parallel, and line L2. Now, check timer CTR makes a "true" start and starts to time its 30 time units before flipping over to its other position at time "36."

At time "10," cam contact CM4 closes to energize and close vent valve VP by forming CIRCUIT NO. C31 from line L2 in FIG. 3 through cam contact CM10B now closed, normally closed relay contact R5–1 of relay coil R5C, relay coil R5C, cam contact CM4 closed at time "10," terminal J5 in FIGS. 3 and 2, vent valve VP in FIG. 2, and Line L2.

The first valve check starts and control is transferred from fire control means FC to valve checking means J.

Now it will be apparent that valve checking means J includes means for sequentially opening upstream valve VX to admit fluid under pressure to conduit or manifold M while downstream valve VG and vent valve VP are closed to pressurize conduit M, closing upstream valve VX, and taking pressure readings on conduit M over a time interval to detect any leak in said downstream valve VG and/or vent valve VP by drop in this pressure.

At time "15," cam contact CM2 closes to energize and open upstream valve VX to fill manifold M with line gas pressure by forming CIRCUIT NO. C33 from line L1 in FIG. 3 through cam contact CM10B now closed, normally closed relay contact R5–1 of relay coil R5C, cam contact CM2 closed at time "15," normally closed relay contact R4–2 of relay coil R4C, terminal J4 in FIGS. 3 and 2, upstream valve VX in FIG 2, and line L2.

At time "20," cam contact CM2 opens to deenergize and close upstream valve VX by breaking Circuit No. C33. Now, line gas pressure is trapped in manifold M.

Control is transferred from fire control means FC to valve checking means J at time "30." Then, cam contact CM1 opens to break Circuit No. C19 to deenergize fire control means FC by deenergizing transformer 108. Then, even if demand switch D in FIG. 2 closes, fire control means FC cannot relight burner 12.

Check timer CTR is actuated at time "36" since it is constructed to flip its contacts (open contact CTR–2 and close contact CTR–1) after timing 30 time units and the timing thereof began at time "6." However, before that happens, cam contact CM9 closes at time "32" to hold system failure relay coil R1C energized by forming HOLDING CIRCUIT NO. C34 from line L1 in FIG. 3 through cam contact CM10B now closed; normally closed relay contact R5–1 of relay coil R5C; cam contacts CM5, CM7 and CM9 now closed; normally open relay contact R1–5 of relay coil R1C closed by relay coil R1C; system failure relay coil R1C; and line L2. Now, when check timer CTR flips to its actuated position at time "36" to open its contact CTR–2 to break Circuit No. C11, Circuit No. C34 holds system failure relay coil R1C energized.

After manifold M has been pressurized from time "15" to time "49," pressure readings are taken of the pressure in manifold M from time "49" to time "52." If the pressure holds, contact 6 of pressure switch PS in FIG. 2 stays closed. Then, closed contact 6 holds energized system failure relay coil R1C by forming HOLDING CIRCUIT NO. C35 along the same path as Circuit No. C34 except through terminal J6 in FIGS. 3 and 2, closed contact 6 of pressure switch PS and terminal J7 in FIGS. 2 and 3 instead of cam contact CM5. At time "49," cam contact CM5 opens to break Circuit No. C34. If the pressure holds at the proper value to keep pressure switch PS contact 6 closed, this first valve check is successful.

If pressure does not hold and failure occurs, pressure switch PS contact 6 does not stay closed and system failure relay coil R1C is deenergized as opening pressure switch PS contact 6 breaks Circuit No. C35.

Deenergizing system failure relay coil R1C starts ALARM SEQUENCE AS described hereafter.

This Alarm Sequence AS is a safety means preventing continued operation of valve checking means J if a defect in operation of one or more of these valves is thus detected. Now, deenergized safety failure relay coil R1C: (1) closes its normally closed relay contact R1–2 to reform Circuit No. C3 to reenergize failure visual signal lamp SL and audible signal alarm SA; (2) opens its normally open relay contact R1–3 to break Circuit No. C29 to deenergize, lock out, and stop cam timer TR and check timer CTR; and (3) opens its normally open relay contact R1–4 to break Circuit No. C19 to deenergize and lock out fire control means FC (which does not need to be deenergized here, but will be deenergized, if necessary). This action shuts down the whole apparatus by stopping valve checking means J and fire control means FC.

If one desires to continue this valve checking cycle, this alarm can be by-passed by pressing push button PB. This single push button PB has two interlocked and rigidly connected contacts PB–1 and PB–2 even though two push buttons PB are shown in FIG. 3. Thus pushing push button PB also keeps fire control means FC deenergized, if necessary. These interlocked contacts on push button PB prevent the operator from jamming push button PB in an unsafe position with some instrument, such as a toothpick. Closing contact PB–2 reenergizes system failure relay coil R1C to override the alarm by forming CIRCUIT NO. C37 from line L1 in FIG. 3 through cam contact CM10B now closed, normally closed relay contact R5–1 of relay coil R5C, normally open but now closed push button contact PB–2, system failure relay coil R1C, and line L2. Simultaneously opening push button contact PB–1 breaks Circuit No. C19 to deenergize fire control means FC in the same manner as opening demand switch D. Push button PB must be pushed until the appropriate open cam contact recloses, which is here shown as open cam contact CM5. Hence, valve checking means J includes a manually actuatable, by-pass means in push button PB for selectively by-passing this safety means or alarm to continue operation of valve checking means J at the will of the operator if a defect in any of the valves is detected.

This is merely one form of alarm, lock out and by-pass system. The specific one designed for any specific job will be determined by the factors involved by balancing safety against utility. Some operators want to be sure that maximum safety is obtained. Then, complete lock out with no means to by-pass might be desired; this can be obtained by eliminating push button contact PB–2. For example, this might be true in a public utility, such as a telephone company, wanting to be sure that no explosion would occur, if it had adequate standby boiler facilities to take over the heat needs until this boiler was repaired. In other installations, utility might be more important than maximum safety. Then, the operator may want only a warning that he could readily by-pass because it was absolutely essential that his sole boiler remain in operation. An example of such installation would be a greenhouse. Hence, the type of alarm, lock out, and by-pass has an infinite number of combinations depending upon the desires of the operator. The alarm may only warn him and do nothing to the system; may lock him out with by-pass contact PB–2 available; may lock him out immediately with no possibility of by-passing the lock out; or may lock him out after the first warning, any suitable combination of warnings, the end of the valve checking cycle, the beginning of the combustion cycle, etc.

This is the end of the description of ALARM SEQUENCE AS.

At time "52," the pressure reading of the first valve check on manifold M ends. Then, cam contact CM5 recloses to reform Circuit No. C34 to form a holding circuit energizing system failure relay coil R1C.

Then, the first valve check ends.

The second valve check now starts. Now, it will be apparent that valve checking means J includes means for sequentially opening vent valve VP while upstream valve VX and downstream valve VG are closed so as to get "0" pressure in conduit M, closing vent valve VP, and checking if the pressure in conduit M rises over a time interval to detect any leak in upstream valve VX.

Vent valve VP is deenergized and opened to get "0" pressure in manifold M. At time "53," cam contact CM4 opens to break Circuit No. C31 to deenergize and open vent valve VP. The pressure drop in manifold M opens pressure switch PS contact 6 to break Circuit No. C35 but system failure relay coil R1C is held energized by Circuit No. C34.

At time "58," vent valve VP is energized and closed. Then, cam contact CM6 closes to energize and close vent valve VP by forming CIRCUIT NO. C39 along the same path as Circuit No. C31 but through cam contact CM6 now closed at time "58" instead of through cam contact CM4.

Now, the valve check is made with "0" pressure in manifold M. If "0" pressure holds, pressure switch PS contact 8 remains closed. This low pressure closing pressure switch PS contact 8 holds energized system failure relay coil R1C by forming HOLDING CIRCUIT NO. C41 from line L1 in FIG. 3 through cam contact CM10B now closed, normally closed relay contact R5–1 of relay coil R5C, closed cam contact CM5, terminal J7 in FIGS. 3 and 2, pressure switch PS contact 8 closed by the "0" pressure, terminal J8 in FIGS. 2 and 3, check timer contact CTR–1 closed after check timer CTR was actuated or flipped after time "36," closed cam contact CM9, normally open relay contact R1–5 of relay coil R1C now closed by energized relay coil R1C, system failure relay coil R1C, and line L2. At time "91," cam contact CM7 opens to break Circuit No. C34 but if the low pressure holds to keep pressure switch PS contact 8 closed, system failure relay coil R1C is held closed by Circuit No. C41.

If the pressure does not hold and failure occurs, pressure switch PS contact 8 does not stay closed. Opening pressure switch PS contact 8 breaks Circuit No. C41 to deenergize system failure relay coil R1C to start Alarm Sequence AS to occur to energize failure signal lamp SL and to lock out and stop the valve checking means J and fire control means FC from further operation in the manner earlier described unless the by-pass is actuated by pushing push button PB to close contact PB–2.

If the low pressure holds, the pressure reading interval on manifold M ends soon thereafter. At time "94," cam contact CM7 recloses to reform Circuit No. C34 to hold energized system failure relay coil R1C. At time "96," cam contact CM6 opens to break Circuit No. C39 to deenergize and open vent valve VP. Any subsequent pressure rise opens pressure switch PS contact 8 to break Circuit No. C41 but system failure relay coil R1C remains held by Circuit No. C34.

Now, the apparatus returns to the same status as originally described at "0" time. At time "98," cam contact CM10A closes and cam contact CM10B opens to simulate a power failure and thus reset the components of this system back to their original position. Opening cam contact CM10B breaks Circuit No. C15 to deenergize system reset relay coil R3C and breaks Circuit No. C34 to deenergize system failure relay coil R1C. At time "0," cam contact CM3B opens to break Circuit No. C29 but cam timer TR and check timer CTR are held energized by Circuit No. C1 reformed when cam contact CM10A closed at time "98."

Also, proper Circuit No. C19 is set up so that it will be reformed at the appropriate time to reenergize fire control means FC upon closing demand switch D at the appropriate time. At time "0," cam contact CM1 closes to set up Circuit No. C19 so that after either system failure relay coil R1C or oil relay coil R5C are energized, fire control means FC will be energized upon closing of demand switch D. This serves as a means for returning the control of downstream gas burner valve VG to fire control means FC if the valve checking cycle is successfully completed, so the Gas Combustion Cycle GCC may be initiated when desired.

That completes the description of the valve checking cycle and now it goes through the same sequence again beginning with the description beginning with time "0" described heretofore.

In any particular burner installation, it is possible to supply a fuel to the burner through a plurality of fuel lines, such as pilot gas line PL, main gas line GL and oil line OL in FIGS. 2 and 4; and to control these respective fuel lines by valves, such as manually operated pilot fuel cock VPL, main gas valves VMG, VX and VG, and oil valves VMO and VO. Although valve checking means J checks only the operation of gas valves VG and VX and vent valve VP, it should be readily apparent that valve checking means J may either be suitably modified or duplicated to check any one or all of the other valves. For example, it may be desirable to check oil valve VO to prevent oil leakage onto the floor and to check pilot gas valve VPL to prevent gas fuel leakage there if each is electrically actuated. To make such modifications in the present apparatus, if desired, should be readily apparent as being within the scope of the present invention by consideration of the examples in the next two paragraphs.

Figures 5, 6:
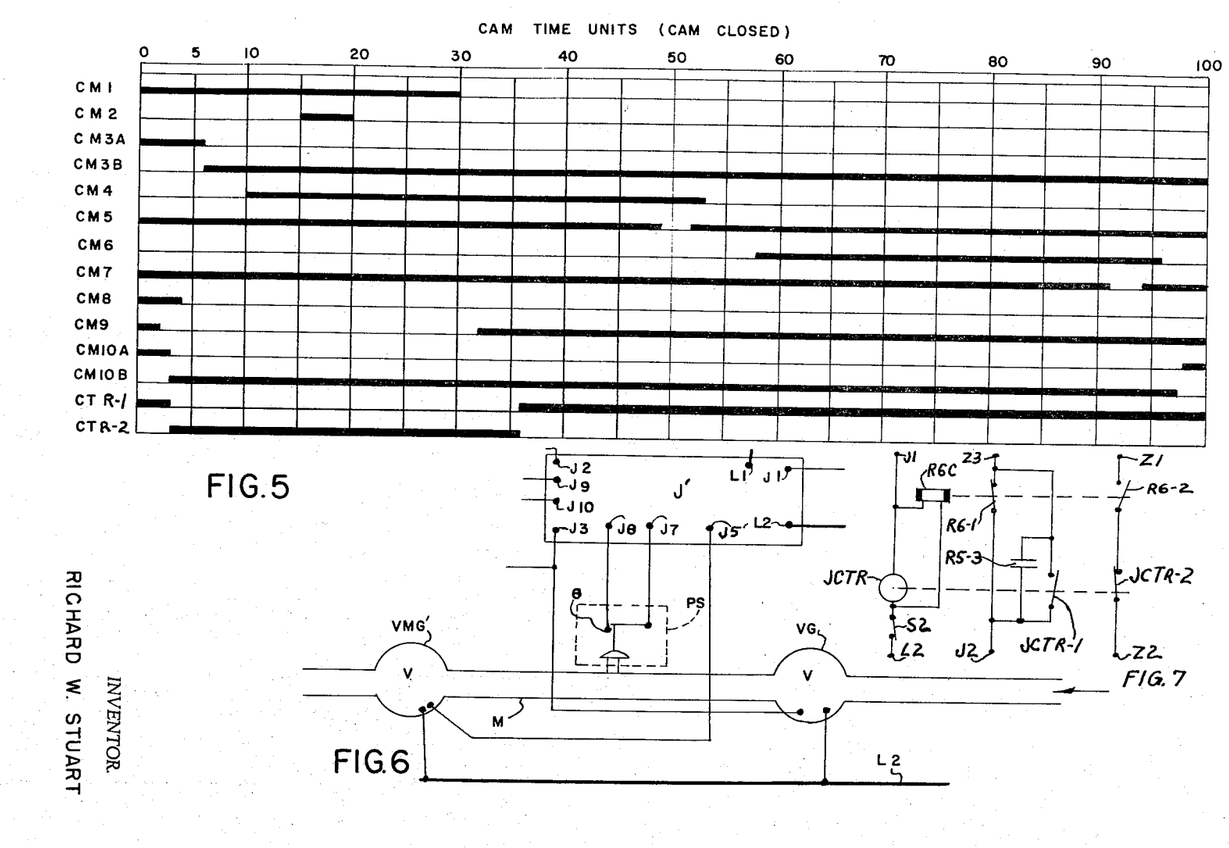
FIG. 5 is a time diagram of the cam closed positions in FIG. 3.
FIG. 6 is a modification adapted to be substituted in FIG. 2 for a portion of the structure therein.

First, two of the FIG. 6 structures may be used. Then, each valve VPL and VO may be separately checked by adding thereto from FIG. 6 the wiring to valve VG, modified valve checking means J, manually or automatically closeable valve VMG' downstream therefrom respectively in each fuel line PL and OL, pressure switch PS and its contact 8, and the wiring therebetween. Then, each valve VPL and VO can be checked by a duplicate of the construction shown in FIG. 6. However, valve checking means J and valve VPL is connected to fire control means FC at terminal Z4 in FIG. 4 instead of terminal F5 in FIGS. 2 and 4, so valve checking means J is responsive to closing of pilot valve 15 (controlled by the circuits described in lines 39–49, column 9 and line 73, column 9, to line 11, column 10, of said Loeber patent) instead of main gas valve VG. Also, cam contact CM1 in FIG. 2 can be shorted out since its action is not needed now. Also, the checking system for valve VPL need not have therein fuel selector switch FS and fuel limit FL in FIG. 2, and the checking system for valve VO goes through the closed oil contacts FS–O1, FS–O3 and FL–O with no connection provided through contact FS–O2 between terminals J9 and J10 in FIG. 2 so as to eliminate the valve check by-passing effect of relay coil R5C in FIG. 3.

Second, duplicates of the three valve structures from FIG. 2 may be used. Valve VPL and VO may be each connected to its own valve VX and VP, pressure switch PS contacts 6 and 8, and valve checking means J structure from FIG. 2 with the alterations in construction described for Z4, CM1, FS and FL in the preceding paragraph. Then, valves VPL and VO will be checked in generally the same manner as earlier described, with each checked by its own valves VX and VP.

Also, it may be desirable to check some but not all of the fuel valves for leakage and improper operation. This mode of operation will next be illustrated wherein gas valve VG is checked for leakage and proper operation but oil valve VO is not so checked. Both oil fuel valve VO and gas fuel valve VG supply fuel to burner 12 in FIG. 4 and are controlled by fire control means FC. However, means are provided activating valve checking means J during operation of gas valve VG and deactivating valve checking means J during operation of oil valve VO. This mode of operation will be described by explaining two modes of operation: (1) switching from gas to oil as a fuel, and (2) switching from oil to gas as a fuel.

Switching from gas to oil as a fuel may take place at any of three different times.

First, fuel selector switch FS in FIG. 2 may be flipped from gas to oil while the apparatus is at rest at time "3." Closing fuel selector switch contact FS–O2 energizes oil relay coil R5C by forming CIRCUIT NO. C43 from line L1 in FIG. 3 through cam contact CM10B closed at time "3," terminal J9 in FIGS. 3 and 2, closed fuel selector switch contact FS–O2 in FIG. 2, terminal J10 in FIGS. 2 and 3, cam contact CM8 closed at time "3," oil relay coil R5C, and line L2. Energizing oil relay coil R5C opens its normally closed contact R5–1 to deenergize valve checking means J by preventing forming therethrough Circuit Nos. C3, C5, C11, C13, C15, C23, C25, C27, C29, C31, C33, C34, C35, C37, C39 and C41.

Now, OIL COMBUSTION CYCLE OCC occurs, as described now.

When demand switch D in FIG. 2 is closed (such as by a suitable thermostat, manually or by a pressure device responsive to the heat needs of the boiler), burner 12 in FIG. 4 provides the heat demanded and oil combustion occurs. Now, fire control means FC in FIG. 4 gives an electrical signal at terminal F5 in FIGS. 4 and 2 to oil valve VO in FIG. 2 when fuel selector switch FS is in the oil selection position with contact FS–O3 closed. Fire control means FC in FIG. 4 provides this signal after flame is proven at flame electrode 18 in FIG. 4. Then, oil valve VO is opened. The following paragraphs will describe this mode of operation in more detail.

Now, Circuit No. C45 is formed to tell the fire control means FC that it may operate. Closing demand switch D in FIG. 2 energizes primary transformer coil 108 in FIG. 4 by forming CIRCUIT NO. C45 along the same path as Circuit No. C19 but through closed oil fuel limit contact FL–O and oil fuel selector switch contact FS–O1 in FIG. 2 instead of through closed gas fuel limit contact FL–G and gas selector switch contact FS–G1 and through closed relay contact R5–2 in FIG. 3 instead of relay contact R1–4. This Circuit No. 45 is formed in place of the circuit formed by closing switch 117 in said Loeber patent and so described in lines 20–32, column 7, of said Loeber patent.

Fire control means FC operates substantially as described in line 39, column 7, to line 11, column 10, of said Loeber patent with the same differences existing in some of the circuits, as described at this point during the description of Gas Combustion Cycle GCC.

Now, fire control means FC gives a signal at its terminal F5 in FIGS. 2 and 4 to oil valve VO in FIG. 2 after the flame has been proven at pilot flame electrode 18 in FIG. 4. See lines 68–70, column 9; and lines 30–36, column 2, of said Loeber patent explaining how flame at electrode 18 energizes relay coil 46. Fire control means FC gives this signal at terminal F5 by forming CIRCUIT NO. C47 (instead of the circuit described in lines 12–23, column 10, of said Loeber patent) as circuit from line L1 to terminal F5 along the same path as Circuit No. C21 but: (1) through closed oil fuel limit contact FL–O and oil fuel selector switch contact FS–O1 in FIG. 2 instead of through closed gas fuel limit contact FL–G and gas selector switch contact FS–G1; and (2) through closed relay contact R5–2 in FIG. 3 instead of relay contact R1–4 to terminal F5 and then through closed fuel selector switch contact FS–O3 in FIG. 2; oil valve VO; and line L2. This action of forming Circuit No. C47 thus energizes and opens oil valve VO by this signal transmitted from terminal F5.

Now, an indefinite period of burning or combustion occurs, as shown by the dotted line in FIG. 1. The time length is solely determined by the length of time that demand switch D is closed. The action now occurring is described in line 25, column 10, to line 10, column 11, of said Loeber patent. This combustion occurs for an indefinite time period until heat demand is satisfied.

If combustion stops, the signal provided by fire control means FC at terminal F5 is stopped so that no signal is provided to valve VO in FIG. 2. Combustion may be stopped by any of various events, such as: (1) the heat need is satisfied and demand switch D in FIG. 2 is opened, as described in lines 47–49, column 11, of said Loeber patent by opening demand switch 117 and deenergizing main relay control coil 95; (2) the flame at burner 12 in FIG. 4 goes out, as described in lines 15–18, column 11, of said Loeber patent by deenergizing coil 46 of relay 45; or (3) the oil pressure is too low.

Circuit No. C47 is broken to deenergize and close oil valve VO when fire control means FC no longer emits its signal from terminal F5 because: (1) demand switch D in FIG. 2 is opened to deenergize relay coil 95 in FIG. 4 to open its normally open relay contact 99, 105, as described in line 49, column 11, of said Loeber patent; or (2) the flame has gone out to deenergize relay 45 coil 46 in FIG. 4 and open its normally open relay contacts 51, 56 and 50, 55 as described in line 18, column 11, of said Loeber patent.

This ends OIL COMBUSTION CYCLE OCC.

Second, fuel selector switch FS can be flipped from gas to oil while burner 12 is burning at time "6." Then, combustion at burner 12 is Gas Combustion Cycle GCC is stopped in FIG. 4. Opening fuel selector switch contact FS–G1 is like opening demand switch D because fuel selector switch FS is a "center-off" switch. This switch opening action breaks Circuit No. C19 to deenergize fire control means FC in the manner earlier described. Opening fuel selector switch contact FS–G3 breaks Circuit No. C21 to deenergize and close main gas valve VG. This is similar to the combustion stopping action described at the end of Gas Combustion Cycle GCC. Since cam contact CM8 is open at time "6," Circuit No. C43 does not form to energize oil relay coil R5C, and the apparatus completes the gas check till cam contact CM10B closes at time "3" in the next valve checking cycle to form Circuit No. C43. Then, the mode of operation takes place as described in the preceding paragraph (labeled "first" and describing gas to oil change occurring at time "3") after forming Circuit No. C43 with the apparatus at rest at time "3."

Third, fuel selector switch FS can be flipped from gas to oil after time "6" and before time "3." Then, valve checking means J will complete the valve checking cycle to time "3." Then, Circuit No. C43 will form and the events described in the earlier preceding paragraph (labeled "first") as occurring when fuel selector switch FS is flipped with the system at rest at time "3" will occur.

The apparatus can be switched from oil to gas burning at any time by flipping fuel selector switch FS in FIG. 2 to close the gas contacts "G." However, as a practical matter, the timing action of valve checking means J will always be at time "3" while on oil because each of the three modes of operation above described, occurring after switching from gas to oil, end on time "3." If oil burner 12 in FIG. 4 is lit, opening fuel selector switch contact FS–O1 is like opening demand switch D to stop Oil Combustion Cycle OCC because it breaks Circuit No. C45 to deenergize fire control means FC. Opening fuel selector switch FS–O3 breaks Circuit No. C47 to deenergize and close oil fuel valve VO. Opening fuel selector switch contact FS–O2 breaks Circuit No. C43 to deenergize oil relay coil R5C. Then, fire control means FC will either then relight on gas or will relight on gas when demand again occurs by closing of demand switch D in FIG. 2. Closing fuel supply switch contact FS–G1 will reform Circuit No. C19 to energize fire control means FC. Closing fuel selector switch contact FS–G3 will, if demand is occurring, form Circuit No. C21 to energize and open gas valve VG. Now, burner 12 is in Gas Combustion Cycle GCC burning gas and valve checking means J is advancing from time "3" to "6" in the same manner as earlier described.

The opening of cam contack CM1 at time "30" in FIG. 5 has been carefully chosen. Cam contact CM1 deenergizes fire control means FC and energizes (or maintains energized) valve checking means J at the appropriate time. This must occur: (1) after the time elapse required for proper operation of safety cut-off means 111 in FIG. 4 after flame failure, and (2) before the time elapse sequentially required for postpurging by motor 11 in FIG. 4 and prepurging by motor 11 before call for heat from burner 12 with relight of burner 12. This relationship assures that there will be adequate time to actuate safety cut-off means 111 but fire control means FC will not be relit while valve checking means J is checking valves. This relationship is shown in the upper valve checking cycle in the right hand column of FIG. 1 to show the time wise relationship of these different factors, even though this specific action of prepurge may not necessarily thus occur. It should be readily apparent that the timing of cam contact CM1 must be designed to tie in with the particular fire control means FC and burner unit B used in FIG. 4. Although the timing of cam contact CM1 can be varied considerably to adapt it to a wide variety of fire units F in FIG. 4, a time "30" for closing cam contact CM1 has been selected here for purposes of illustration. Note that time "30" is really 36 seconds because 100 time units in FIG. 1 represent two minutes.

It is necessary that safety cut-off means 111 in FIG. 4 be permitted to trip, if flame failure occurs and demand for heat still exists by closed demand switch D, before cam contact CM1 deenergizes fire control means FC so that this unsafe condition will be detected. When this occurs, fire control means FC acts in this manner. As described in lines 11–20, column 11, of said Loeber patent, flame failure deenergizes relay 45 coil 46 and shuts gas valves VG and 15. Deenergizing flame relay 45 coil 46 also closes its contact 48, 53 to energize its heater 114 in FIG. 4 by forming Circuit No. C49 (also described in lines 51–62, column 9, of said Loeber patent) from the lower terminal of transformer secondary 109 through conductor 208; heater 114; conductor 179; normally open relay contact 69, 65 of relay coil 64 now closed by energized relay coil 64; conductor 190; normally closed contact 53, 48 of relay coil 46; conductor 209; normally open relay contact 102, 96 and contact 103, 97 of relay coil 95 via conductor 193 now closed by energized relay coil 95; conductors 194 and 195; tap 110; and transformer secondary 109. After Circuit No. C49 remains formed from 20 to 30 seconds, for example, heater 114 in FIG. 4 warps bimetal 113 and opens switch 112 in safety cut-off means 111 to deactivate fire control means FC and may sound a suitable alarm. Opening switch 112 deenergizes main control relay coil 96 (by breaking the circuit described in lines 59–67, column 7, of said Loeber patent) to then break Circuit No. C49 by opening relay contacts 96, 102 and 97, 103. Since cam contact CM1 does not open until 36 seconds, power was maintained on fire control means FC to get this alarm and suitable action by safety cut-off means 111 before 36 seconds occurred. Now, valve checking means J can continue to operate through its valve checking cycle but the fire control means FC cannot relight until safety cut-off means 111 has been manually reset.

To avoid having burner 12 relit and in the combustion cycle and having valve checking means J operating simultaneously, it is necessary that cam contact CM1 open before the total time elapse of post and prepurge occurs before relight. As examples of typical times, the postpurge (described in lines 51–60, column 11, of said Loeber patent) may take about 20 seconds and the prepurge (described in lines 6–12, column 5, and in lines 15–20, column 9, of said Loeber patent) may take about 30 seconds. These times run consecutively, instead of concurrently, and the operator cannot reactivate burner 12 until after these times have so run consecutively and prepurging is finished. Reactivating burner 12 in the burning cycle calls for reforming Circuit No. C19 on gas, as described in lines 25–32, column 7, of said Loeber patent. This cannot occur until after relay coil 64 has deenergized to open its closed contact 68, 74 at the end of the postpurge period (see lines 57–60, column 11, of said Loeber patent) and to close its contact 67, 73, as described in lines 30–31, column 7, of said Loeber patent. Since cam contact CM1 opens at 36 seconds, it opens before the consecutive elapse of 20 plus 30 seconds, or 50 seconds, required for the consecutive action of postpurge and prepurge before burner relight caused by forming Circuit No. C21 or C47 and described in lines 23–24, column 10, of said Loeber patent.

It should be readily apparent that the time of 36 seconds for opening of cam contact CM1, the time of 20 to 30 seconds for opening switch 112 of safety cut-off means 111, the time of 20 seconds for postpurge, and the time of 30 seconds for prepurge may vary considerably for different types of fire control means FC used, but in each case, the opening time of cam contact CM1, and of any other component in valve checking means J, can be suitably designed or adjusted to adapt valve checking means J to the particular fire control means FC used.

The "fail safe" features of this apparatus will be described primarily for gas operation but it should be readily apparent that similar action occurs for oil operation, whenever appropriate.

The apparatus includes means assuring that each component in valve checking means J will "fail safe," so that if any failure thereof occurs, it will not be indicated as a safe valve check. Now, each of the components PS in FIG. 2; and TR, CTR, R1C, R3C, R2C, SL, R4C and R5C in FIG. 3 will be individually considered in that order. Generally, failure of any of these components, except relay coil R5C, during oil operation is not important because each is in valve checking means J not used during oil operation.

Any failure of pressure switch PS "fails safe." Pressure switch PS may fail and not be responsive to variations in pressure by having its mechanism freeze, its diaphragm break, its pressure line became plugged, etc. However, since pressure switch PS must cycle from high pressure at time "49"–"52" to zero pressure at time "91"–"94" once each valve checking cycle, any failure of pressure switch PS will start Alarm Sequence AS, as aforedescribed if it does not so cycle.

Any failure of cam timer TR "fails safe." First, if failure occurs between time "98" and time "3," a complete shut down occurs. Since cam timer TR is dead, we get no valve check. Fire control means FC is inactivated. Since relay contact R1-4 of relay coil R1C is open after Circuit No. C34 broke at time "98," Circuit No. C19 cannot form to actuate fire control means FC. Also cam contact CM1 is open from time "98" to time "0." Second, if failure occurs between time "3" and time "30," either Circuit No. C23 or Circuit No. C29 is formed to energize check timer CTR. At the end of time "36," check timer CTR flips and opens its check timer contact CTR-2 and closes its contact CTR-1. Opening contact CTR-2 breaks Circuit No. C11. Open cam contact CM9, open when cam timer TR stops before time "30," prevents formation of Circuits Nos. C34 and C41. Hence, system failure relay coil R1C is deenergized and Alarm Sequence AS occurs after Circuit No. C11 breaks. Third, if failure occurs after time "30," cam contact CM1 opens and Circuit No. C19 cannot form to actuate fire control means FC.

Any failure of check timer CTR "fails safe." If check timer contact CTR-1 does not transfer over and close at time "36," failure occurs at time "91" when cam contact CM7 and Circuit No. C41 will not form because check timer contact CTR-1 is not closed. When Circuit No. C41 does not then form, system failure relay coil R1C is deenergized and Alarm Sequence AS occurs.

Any failure of system failure relay coil R1C "fails safe." Then, Alarm Sequence AS occurs and failure signal lamp SL comes on. Fire control means FC is inactivated because deenergized system failure relay coil R1C opens its normally open relay contact R1-4 to prevent Circuit No. C19 from forming.

Any failure of system reset relay coil R3C "fails safe." If relay coil R3C fails, its normally open relay contact R3-3 doesn't close so that relay coil R3C cannot latch itself in by forming Circuit No. C15. Also, its normally open relay contact R3-2 does not close so that Circuit No. C21 does not form to energize fuel slave relay coil R4C. Failure to energize relay coil R4C prevents forming Circuit No. C25 to energize and open upstream valve VX. This action either stops or prevents any combustion by fire control means FC. Since its normally open relay contact R4-3 does not close, timer TR and check timer CTR never make the travel from time "3" to time "6." This stops valve checking means J.

Any failure of delay relay coil R2C "fails safe." The next Circuit required, Circuit No. C13, will not form because its relay contact R2-1 will not close.

Any failure of signal lamp SL "fails safe." Valve checking means J and fire control means FC is inactivated since Alarm Sequence AS is occurring but failure of failure signal lamp SL only gives no vision of failure. Audible signal alarm SA may still sound.

Any failure of fuel slave relay coil R4C "fails safe."

Failure to energize relay coil R4C prevents forming Circuit No. C25 to energize and open upstream valve VX. This action either stops or prevents any combustion by fire control means FC. Since its normally open relay contact R4-3 does not close, timer TR and check timer CTR never makes the travel from time "3" to time "6." This stops valve checking means J.

Any failure of oil relay coil R5C "fails safe." Any failure of relay coil R5C only causes repeated checking of gas valves at end of each combustion cycle even though combustion is oil fired. First, if the gas line is pressurized, no problem occurs. Second, if the gas line is not pressurized, the operator will get a failure in each valve check cycle at time "49" when Circuit No. C35 will not form because pressure switch contact PS-6 will not close. If the operator pushes push button PB, he will override this problem.

If any power failure occurs, the electrically operated valve checking means J will "fail safe" upon an electrical power failure thereto. First, if power failure occurs while fire control means FC is in operation, combustion is stopped because this is the same as opening demand switch D to turn off the heat and break Circuit No. C19 in gas operation or Circuit No. C45 in oil operation. Then, combustion is stopped, the end of the burning cycle occurs, and the valve checking cycle commences. Power failure deenergizes and closes either: (1) valves 15, VG and VX as described at the end of Gas Combustion Cycle GCC and the valve check occurs after power resumes; or (2) valve VO as described at the end of Oil Combustion Cycle OCC. Second, if power failure occurs during the valve checking cycle, when manifold M is pressurized at time "49" to time "52," then deenergization vent valve VP by breaking Circuit No. C31. Since this drops pressure in manifold M, we get a simulated valve failure. However, pushing push button PB will continue the valve checking cycle after power is restored. Third, if power failure occurs during the valve checking cycle at any other time, cam timer TR restarts when energized and the valve checking cycle continues. Hence, this mode of operation assures that either a valve checking cycle is completed or fail safe occurs after any power failure following a combustion cycle.

This ends the description of the mode of operation, and general comments will be given hereafter.

Although the layout in FIG. 2 is the preferred form, it should be readily apparent that other modifications in structure come within the scope of the present invention. For example, it is possible to use only some of the features of the automatic valve checking means J by substituting the construction of FIG. 6 in FIG. 2 and eliminating some of the circuitry in valve checking means J as described hereafter in next paragraph. Then, main gas valve VG is the upstream valve and manually or automatically closeable valve VMG' is downstream thereof with gas valve VX eliminated. Then, automatically closing upstream gas valve VG first, and then subsequently closing downstream gas valve VMG', will automatically test gas valve VG for leakage. If the "0" pressure does not hold and pressure then builds up in manifold M between valves VG and VMG', as detected by opening pressure switch PS contact 8, automatic gas valve VG leaks and Alarm Sequence AS occurs.

This is the structure in FIG. 6. Now, since valves VX and VP are not being actuated, valves VX and VP and terminal J4 are eliminated in FIG. 6 and Circuit Nos. C25, C27, C31, C33, C35 and C39 are not used. Since the first pressure valve check is not used, an electrical jumper or short can be put in parallel with cam contact CM5 in FIG. 3 to eliminate Circuit No. C35, the effect of opening contact CM5, and this valve check. This is the first modification of valve checking means J in FIGS. 2 and 3 to make valve checking means J' in FIG. 6. Also, no connections need be made to terminal J6 in FIG. 6. At time "58," check of valve VG in FIG. 6 can begin by then manually closing valve VMG' (if valve VMG' is not connected to terminal J5', as hereinafter described) since valve VG is already closed. However, it is preferred to automatically close valve VMG' at time "58" by eliminating in FIG. 3 relay contact R4-5 and cam contact CM4 but connecting terminal J5 in FIG. 2 as terminal J5' in FIG. 6 to valve VMG so as to close valve VMG' at time "58" by forming CIRCUIT NO. C51 along the same path as Circuit No. C39 but through terminal J5' and valve VMG' instead of through terminal J5 and vent valve VP. Then, from time "91" to "94," check of valve VG occurs as contact CM7 opens to form Circuit No. C41 through pressure switch PS contact 8 in FIG. 6 to operate in the manner afore-described. Then, Circuit No. C51 breaks at time "96" to hold valve VMG' open at all times except during this valve check. Valve checking means J' in FIG. 6 is identical to valve checking means J in FIGS. 2 and 3 except as explained in this paragraph heretofore.

The FIG. 6 construction is not as desirable as the FIG. 2 construction for some valve checking for several reasons. First, pressure switch PS in FIG. 6 will not "fail safe" because it does not cycle through high and low pressure. Second, valve VMG' is never checked for leaks; if it leaks, you will get a poor leak check on valve VG. Since both valves VMG' and VG are operated with the same frequency, valve VMG' may prematurely develop a leak. However, FIG. 6 may be more desirable in some installations for economic reasons that the FIG. 2 construction.

It should be noted that valve checking means J and J' in FIGS. 2, 3 and 6 are easily adapted to any existing fire unit F, etc. Terminals J1, J2, J3, J4, J5, J6, J7, J8, J9, J10, L1 and L2 are easily put into a disconnectable plug-in socket to thus be connected with the corresponding leads in a mating socket in any conventional fire unit F because substantially all fire units F work basically the same. This construction of a disconnectable plug-in socket arrangement also permits this apparatus to be readily serviced by permitting valve checking unit J to be disconnected as a unit for servicing and suitable circuit testing if a defect occurs.

It should be noted that if a defect is observed in the valve checking cycle, if Alarm Sequence AS occurs, and if push button PB is pushed to by-pass this alarm, the safety lock out action of the Alarm Sequence AS will continually and consistently stop the apparatus each cycle at the same point if the defect is not corrected.

Note also that main fuel burner valve VG or VO is controlled by the fire control means FC, and not by valve checking means J, so as to operate independently of valve checking means J.

Valve checking means J detects numerous defects in the operation of the valve means, including a defect in the (1) opening of upstream valve VX because no pressure then enters manifold M, (2) opening of vent valve VP because no "0" pressure occurs in manifold M if vent valve VP does not open, (3) and the closing of vent valve VP because no pressure will build up in manifold M if vent valve VP cannot close. It is not economically desirable to keep vent valve VP open and not enable it to close because this would exhaust gas wastefully to the atmosphere. Hence, this valve check checks on the operating economy of the apparatus and assures that it will operate at minimum cost. Valve checking means J is operable to detect defects in the operation of each of the valves VX, VG and VP and is operable to detect the defect in the operation of valve VG without operating valve VG and while valve VG remains fully closed.

Valve checking means J is capable of checking the operation of any fluid flow controlling valve means and of detecting any of numerous defects in the operation thereof, including a leak in a closed valve, improper closing of the valve, and/or improper opening of the valve.

In this specific installation, pressurized manifold M checks valves VG and VP for leaks and improper operation. The "0" pressure in manifold M checks valve VX for leaks and improper operation. Of course, it should be readily apparent that if valve VG or VP leads, it will reduce the sensitivity of the "0" pressure test for leakage of valve VX, but in any event, valve checking means J will give adequate warning by Alarm Sequence AS of unsafe, dangerously explosive, or uneconomical operation.

Valve checking means J checks fuel burner valves VG and VX for defects once for each combustion cycle. The valve checking cycle is not concurrent with the combustion cycle, and the valve checking cycle is located contiguous to the terminal end of the combustion cycle so as not to needlessly delay furnishing heat when it is subsequently demanded.

However, it should be readily apparent that this valve checking cycle could be contiguous to either end of the combustion cycle, such as being located at the beginning of the combustion cycle, such as after heat demand occurs by closing demand switch D but before combustion begins at burner 12. Although this might generally be impractical because it lengthens the time between closing demand switch D and when heat is furnished by burner 12, it might be desirable in other circumstances. For example, (1) if the boiler closes down on Friday and the next demand occurs on Monday morning, it may be more desirable to valve check on Monday morning before first combustion occurs than after the last combustion on Friday because leaking gas over the week end might build up to an unsafe condition adapted to explode when the burners are lit in Monday morning, (2) the valve checking is then always closer to a starting combustion cycle when an explosion might be likely to occur, and (3) in some industries, such as the processing industry, heat is either not needed or not wanted until several minutes after demand switch D is closed so it would be practical to provide the valve checking cycle then before the combustion cycle begins. It should be apparent that minor modifications of the circuitry disclosed herein will permit this mode of operation. Some examples of such modifications are given in the paragraphs hereafter. Let us assume for the purposes of this discussion that valve checking means J checks the valves during gas operation but not during oil operation, as earlier described.

FIG. 7 permits having a valve check by valve checking means J in FIG. 3 at both ends of the gas combustion cycles and having no valve check on oil. This description will start at the point earlier described wherein closing demand switch D forms Circuit No. C19 or C45. Although this action as earlier described started operation of fire control means FC, operation of fire control means FC either operating on gas will be delayed now until after the valve checking cycle has been successfully completed or operating on oil will begin immediately.

Hence, now it will be apaprent that, while operating on gas, valve checking means J includes means responsive to demand for heat from fire control means FC by closing demand switch D for first actuating valve checking means J, and upon successful completion of the valve checking cycle, actuating fire control means FC to supply heat. Therefore, the valve checking cycle begins immediately before the combustion cycle so as to be contiguous to the beginning end of this Gas Combustion Cycle GCC.

The structure in FIG. 7 is easily placed in FIG. 3 to modify FIG. 3. Terminals J1, L2, Z3, J2, Z1, and Z2 are easily connected and the line connecting terminals J2 and Z3 in FIG. 3 is removed.

When demand switch D closes, Circuit No. C19 or C45 momentarily forms at time "3" to energize fire control means FC, but: (1) with gas, this is a false start with fire control means FC soon deenergized and the valve checking cycle taking place instead in valve checking means J; and (2) with oil, fire control means FC is immediately energized. Closing demand switch D forms CIRCUIT NO. C55 or CIRCUIT NO. C57 respectively along the same paths as Circuit Nos. C19 and C45 but through normally closed relay contact R6–1 of relay coil R6C in FIG. 7 between terminals Z3 and J2. Closing demand switch D in FIG. 2 also: (1) energizes valve check selection check timer JCTR in FIG. 7 by forming CIRCUIT NO. C59 from line L1 in FIG. 2 along the same path as Circuit No. C19 or C45 to terminal J1 in FIG. 3 and then through valve check selection check timer JCTR and switch S2 in FIG. 7 to line L2; and (2) energizes valve check selector relay coil R6C in FIG. 7 by forming CIRCUIT NO. C61 from line L1 in FIG. 2 along the same path as Circuit No. C59 but through valve check selector relay coil R6C instead of valve check selection check timer JCTR. Energizing relay coil R6C opens its normally closed relay contact R6–1 in FIG. 7 to deenergize fire control means FC by breaking Circuit No. C55 or C57. However, since normally open relay contact R5–3 of oil relay coil R5C is closed during oil operation, CIRCUIT NO. C67 along the same path as Circuit No. C45 but through this now closed relay contact R5–3 in FIG. 7 forms the equivalent of Circuit No. C45 to cause Oil Combustion Cycle OCC to now occur immediately as earlier described without any valve checking action.

Valve checking occurs in gas operation. Energizing relay coil R6C also closes its normally open relay contact R6–2 to start the valve checking action by valve checking means J (only if fire control means FC is operating on gas but not if it is operating on oil since this circuit opens at relay contact R5–1) by energizing cam timer TR and check timer CTR by forming CIRCUIT NO. C65 from line L1 in FIG. 3 through normally open cam contact CM10B now closed at time "3," normally closed relay contact R5–1, terminal Z1, normally open relay contact R6–2 now closed, normally closed check timer contact JCTR–2, terminal Z2, cam timer TR and check timer CTR in parallel, and line L2. This action is the same as forming Circuit No. C23 at time "3." This Circuit No. C65 continues to be formed until after cam contact CM3B in FIG. 3 closes and forms Circuit No. C29, which assures continual operation of valve checking means J and completion of the valve checking cycle thereby. At time "30," cam csontact CM1 in FIG. 3 opens to break Circuit No. C55 to assure deactivation of fire control means FC during operation of valve checking means J. After cam contact CM1 opens at time "30," valve check selection check timer JCTR, set to transfer its contacts after timing 30 units, will transfer its contacts to the other posiion at time "33." This action close its normally open contact JCTR–1 and opens its normally closed contact JCTR–2. Closing check timer contact JCTR–1 sets up for later forming CIRCUIT NO. C69 along the same path as Circuit No. C19 but through normally open check timer contact JCTR–1 now closed. However, this Circuit No. C69 cannot now form because cam contact CM1 is open. Opening check timer contact JCTR–2 breaks Circuit No. C65 to prevent recycling of valve checking means J when it finishes a valve check at time "0." Now, valve checking means J completes its valve check action.

At time "0," cam contact CM1 closes to energize fire control means FC on gas if the valve check has been successful. When cam contact CM1 closes at time "0," Circuit No. C69 then forms to energize fire control means FC on gas. Since this action is equivalent to forming Circuit No. C19, as earlier described, Gas Combustion Cycle GCC now takes place in the manner earlier described.

At the end of either combustion cycle GCC or OCC, opening demand switch D breaks Circuit No. C67 or C69 in the same manner as earlier described for Circuit No. C19 or C45. Also, when demand switch D opens, this action breaks Circuit No. C61 to deenergize valve check selector relay coil R6C and breaks Circuit No. C59 to deenergize valve check selection check timer JCTR. This action resets check timer JCTR contact JCTR-1 to its normally open position and contact JCTR-2 to its normally closed position.

Now, either another valve check occurs by valve checking means J if this the end of Gas Combustion Cycle GCC or the valve check is omitted if this is the end of the Oil Combustion Cycle OCC, as earlier described for FIGS. 2 and 3.

If a valve check has taken place, it ends at time "0," as earlier described, and valve checking means J travels to time "3" to rest until demand switch D closes to restart the above described sequence by reforming Circuit Nos. C57 and C59.

Now, it should be apparent that the valve checking cycle is located contiguous to both ends of Gas Combustion Cycle GCC.

Opening switch S2 in FIG. 7 eliminates the valve checking cycle from the beginning end of the combustion cycle, earlier described. Opening switch S2 is equivalent to removing the FIG. 7 construction from FIG. 3. This switch S2 is a selective means for deactivating that valve checking cycle located at the beginning end.

The valve checking by pressure switch PS has been described as closing contacts 8 and 6 respectively at "0" and line pressure. It should be understood that these pressures, as these terms are used here, depend on the size of manifold M. If manifold M were small in volume, only a small valve leak would make a major pressure change. Therefore, "0" and line pressure are defined during checking by pressure switch PS to broadly include respectively low pressure below one-half line pressure and high pressure between one-half and full line pressure. For example, pressure switch PS can be a single pole double throw pressure switch flipping over center at mid pressure position. Then, for example, with 11 inches line pressure, it may move upon rising pressure from contact 8 to 6 at 6 inches pressure and may move upon falling pressure from contact 6 to 8 at 5 inches pressure. Such switch PS will accurately check a small manifold M within practical valve leak limits.

Valves VX and VG in FIG. 2 are properly designated herein respectfully as upstream valve VX and downstream valve VG. Each valve is an identically constructed automatic, safety shut-off valve. Each valve is independently checked for leaks by the valve checker; each valve is simultaneously opened or closed to control fuel flow to burner 12 during the combustion cycle and each valve is closed during the rest or down cycle when valve checking is not occurring. Although valve VG has sometimes been designated herein as the burner valve or main fuel burner valve to distinguish it from upstream valve VX, both valves are burner valves controlling burner 12 and act, and are acted upon, in generally the same manner except valve VX has additional movements. Therefore, either or both valves VG and VX can be properly called a "burner valve" or "stream valve" controlling the main fuel stream, and these quoted terms are defined herein to include either valve VX or VG. However, since valve VX is operated more frequently than valve VG, valve VX is more likely to develop a leak first so valve VG will probably be relied on more heavily as the main burner valve.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency to the claims are therefore intended to be embraced therein.

What is claimed and desired to be secured by U. S. Letters Patent is.

1. An apparatus for checking the operation of a fluid flow controlling valve means, comprising valve checking means for automatically detecting a defect in the operation of said valve means, said valve means comprising three valves including a conduit, an upstream valve and a downstream valve connected to control in series flow through said conduit, a vent valve connected in fluid communication with said conduit between said upstream and downstream valves for selectively sealing or venting said conduit, and means for moving one of said valves other than the downstream valve between open and closed positions in timed sequence with movement of said downstream valve between these positions.

2. An apparatus, as set forth in claim 1, with said valve checking means being responsive to a failure to open of said upstream valve as a defect.

3. An apparatus, as set forth in claim 1, with said valve checking means being responsive to a failure to open of said vent valve as said defect.

4. An apparatus, as set forth in claim 1, with said valve checking means being responsive to a failure to close of said vent valve as said defect.

5. An apparatus, as set forth in claim 1, with said valve checking means being responsive to a leak in said upstream valve as said defect.

6. An apparatus for checking the operation of a fluid flow controlling valve means, comprising valve checking means for automatically detecting a defect in the operation of said valve means, said valve means comprising three valves including a conduit, an upstream valve and a downstream valve connected to control in series flow through said conduit, and a vent valve connected in fluid communication with said conduit between said upstream and downstream valves for selectively sealing or venting said conduit, said valve checking means including means for detecting a defect in the operation of each of said valves.

7. An apparatus for checking the operation of a fluid flow controlling valve means, comprising valve checking means for automatically detecting a defect in the operation of said valve means, said valve means comprising three valves including a conduit, an upstream valve and a downstream valve connected to control in series flow through said conduit, and a vent valve connected in fluid communication with said conduit between said upstream and downstream valves for selectively sealing or venting said conduit; said valve checking means including means for sequentially opening said upstream valve to admit fluid under pressure to said conduit while said downstream and vent valves are closed to pressurize said conduit, closing said upstream valve, and taking pressure readings on said conduit over a time interval to detect any leak in said downstream and/or vent valve by drop in said pressure.

8. An apparatus for checking the operation of a fluid flow controlling valve means, comprising valve checking means for automatically detecting a defect in the operation of said valve means, said valve means comprising three valves including a conduit, an upstream valve and a downstream valve connected to control in series flow through said conduit, and a vent valve connected in fluid communication with said conduit between said upstream and downstream valves for selectively sealing or venting said conduit; said valve checking means including means for sequentially opening said vent valve while said upstream and downstream valves are closed so as to get "0" pressure in said conduit, closing said vent valve, and checking if pressure in said conduit rises over a time interval to detect any leak in said upstream valve.

9. An apparatus for checking the operation of a fluid flow controlling valve means, comprising valve checking means for automatically detecting a defect in the operation of said valve means, said valve means being at least one of two valves controlling flow in series in the same conduit, said one valve being located upstream from the other valve, said valve checking means including means for checking the pressure in said conduit between said valves after closing said upstream valve before closing the other valve to check said upstream valve for leaks.

10. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said apparatus including safety means preventing continued operation of said apparatus if a defect in operation of said valve means is detected, said valve checking means including manually actuatable by-pass means for selectively by-passing said safety means to continue operation of said apparatus at the will of the operator if a defect in said valve means is detected.

11. An apparatus, as set forth in claim 10, with said valve checking means including safety lock out means for continually stopping said apparatus each cycle, after the cycle of actuation of said by-pass means, if the defect is not corrected.

12. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said valve checking means being operable through a valve checking cycle not concurrent with said combustion cycle, said apparatus including means for energizing said valve checking means for locating said valve checking cycle contiguous to only one end of said combustion cycle if the time between said combustion cycles is greater than the time of said valve checking cycle.

13. An apparatus, as set forth in claim 12, with said valve checking cycle beginning at the terminal end of said combustion cycle so as not to needlessly delay furnishing heat when it is subsequently demanded.

14. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said valve checking means being operable through a valve checking cycle not concurrent with said combustion cycle, said apparatus including means for energizing said valve checking means for locating said valve checking cycle contiguous to one end of said combustion cycle, said valve checking cycle beginning at the terminal end of said combustion cycle so as not to needlessly delay furnishing heat when it is subsequently demanded, said fire control means having means post purging the burning zone of said burner, at least a portion of said valve checking cycle occurring during said post purging.

15. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said burner valve including an oil fuel valve and a gas fuel valve supplying fuel to said burner controlled by said fire control means, said apparatus including means activating said valve checking means during gas valve operation and deactivating said valve checking means during oil valve operation.

16. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said apparatus including means preventing operation of said combustion cycle until after successful completion of the valve checking cycle by said valve checking means.

17. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said apparatus including means for returning control of said burner valve to said fire control means, if the valve checking cycle is successfully completed, so the combustion cycle may be initiated when desired.

18. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said apparatus including means operating said burner valve by said fire control means independently of said valve checking means.

19. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said valve checking means including means for checking said valve means for defects once for each combustion cycle and including means for operating said checking means for a time period independent of the time between said combustion cycles.

20. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said valve checking means including means responsive to demand for fuel by said fire control means for readying said valve checking means for its valve checking cycle.

21. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said fire control means including a time delayed flame failure safety cutoff means, said apparatus including means for energizing said valve checking means at the terminal end of said combustion cycle and for deenergizing said fire control means without flame failure after the time elapse at the terminal end of said combustion cycle required for operation of said safety cutoff means after flame failure so as to prevent reenergization of the fire control means during the valve checking cycle while assuring proper operation of said safety cutoff means.

22. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said fire control means including a prepurging means and a postpurging means for the burning zone of said burner, said apparatus including means for energizing said valve checking means at the terminal end of said combustion cycle, and for deenergizing said fire control means before the time elapse required for sequentially postpurging and prepurging before relight of the burner by call for heat from the burner.

23. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, another burner valve located in said conduit downstream from said first mentioned burner valve, said valve checking means including means for checking the pressure in said conduit between said valves after closing said first burner valve before said other burner valve is closed to check said first burner valve for leaks.

24. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said apparatus including safety means preventing continued operation of said apparatus if a defect in operation of said valve means is detected, said valve means comprising three valves including an upstream burner valve and said first mentioned burner valve as a downstream valve connected to control in series flow through said supply conduit, and including a vent valve connected in fluid communication with said conduit between said upstream and downstream valves for selectively sealing or venting said conduit.

25. An apparatus, as set forth in claim 24, with said valve checking means including means responsive to demand for fuel by said fire control means for opening said upstream and downstream valves and for closing said vent valve.

26. An apparatus, as set forth in claim 24, with said valve checking means including means responsive to shut off of fuel to said burner by said fire control means by closing one of said stream valve for closing the other of said stream valves and opening said vent valve at the terminal end of the combustion cycle and at the start of the valve checking cycle.

27. An apparatus, as set forth in claim 26, with said valve checking means including means for sequentially opening said upstream valve to admit fluid under pressure to said conduit while said downstream and vent valves are closed to pressurize said conduit, closing said upstream valve, and taking pressure readings on said conduit over a time interval to detect any leak in said downstream and/or vent valve by drop in said pressure.

28. An apparatus, as set forth in claim 27, with said valve checking means including means for sequentially opening said vent valve while said upstream and downstream valves are closed so as to get "0" pressure in said conduit, closing said vent valve, and checking if pressure in said conduit rises over a time interval to detect any leak in said upstream valve.

29. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said valve checking means being operable through a valve checking cycle not concurrent with said combustion cycle, said apparatus including means for energizing said valve checking means for locating said valve checking cycle contiguous to one end of said combustion cycle, said valve checking cycle beginning immediately before said combustion cycle to be contiguous to the beginning end of said combustion cycle, said valve checking means including means responsive to demand for heat from said fire control means for sequentially actuating said valve checking means and upon successful completion of the valve checking cycle actuating said fire control means to supply heat.

30. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said valve checking means being operable through a valve checking cycle not concurrent with said combustion cycle, said apparatus including means for energizing said valve checking means for locating said valve checking cycle contiguous to one end of said combustion cycle, said valve checking cycle located contiguous to either end of said combustion cycle, and selective means for deactivating the valve checking cycle located at one of said ends.

31. An apparatus for checking the operation of a fluid flow controlling valve means, comprising valve checking means for automatically detecting a defect in the operation of said valve means, said valve means comprising three valves including a conduit, an upstream valve and a downstream valve connected to control in series flow through said conduit, and a vent valve connected in fluid communication with said conduit between said upstream and downstream valves for selectively sealing or venting said conduit, said valve checking means being responsive to a leak in said vent valve as said defect.

32. An apparatus for checking the operation of a fluid flow controlling valve means, comprising valve checking means for automatically detecting a defect in the operation of said valve means, said valve means comprising three valves including a conduit, an upstream valve and a downstream valve connected to control in series flow through said conduit, and a vent valve connected in fluid communication with said conduit between said upstream and downstream valves for selectively sealing or venting said conduit, said valve checking means being responsive to a leak in said downstream valve as said defect.

33. An apparatus for checking the operation of a fluid flow controlling valve means, comprising valve checking means for automatically detecting a defect in the operation of said valve means, a fuel burner in said apparatus, a fuel supply conduit supplying fuel to said burner, said valve means including a burner valve controlling fuel flow through said conduit to said burner for operating said burner through a combustion cycle, and fire control means for controlling the operation of said burner by said burner valve, said valve checking means including means for checking said valve means for defects once for each combustion cycle and including means for operating said checking means for a time period of fixed length even though the time between the said combustion cycles may be of variable length.

34. An apparatus for checking the operation of a fluid flow controlling valve means, comprising valve checking means for automatically detecting a fluid flow leak in said valve means by exhausting to atmosphere any leak fluid test sample and directing it away from any source of combustion.

35. An apparatus for checking the operation of a fluid flow controlling valve means, comprising a fuel burner in a combustion zone in said apparatus, a fuel supply conduit supplying fuel as said fluid to said burner, said valve means including a burner valve controlling fuel flow through said conduit to said burner for operating said burner through a combustion cycle, and valve checking means for automatically detecting a fluid flow leak in said valve means by exhausting to atmosphere and away from said combustion zone any fuel leak test sample.

36. An apparatus for checking the operation of a fluid flow controlling valve means, comprising valve checking means for automatically detecting a defect in the operation of said valve means, said valve means including two valves controlling flow in series in the same conduit, said valve checking means including means for automatically detecting a defect in the operation of each of said valves, and means for closing both of said valves simultaneously so that one of said valves will stop fluid flow through said conduit if a defect is detected in the other of said valves.

References Cited

UNITED STATES PATENTS

| | | | |
|---|---|---|---|
| 2,691,773 | 7/1951 | Lichtenberger | 340—242 |
| 3,086,583 | 4/1963 | Reichow | 158—123 |
| 3,099,163 | 7/1963 | Raymond | 73—168 |
| 3,236,284 | 2/1966 | Kemper | 158—123 |

FREDERICK L. MATTESON, JR., *Primary Examiner.*

E. G. FAVORS, *Assistant Examiner.*

UNITED STATES PATENT OFFICE
CERTIFICATE OF CORRECTION

Patent No. 3,358,732

December 19, 1967

Richard W. Stuart

It is certified that error appears in the above identified patent and that said Letters Patent are hereby corrected as shown below:

Column 2, line 5, "J will" should read -- J will also --. Column 4, line 48, "T2" should read -- L2 --. Column 5, line 13, "CIRCUIT C11" should read -- CIRCUIT NO. C11; line 23, "rest" should read -- reset --. Column 12, line 6, "J" should read -- J' --. Column 14, line 48, "contack" should read -- contact --. Column 15, line 10, "Circuit No. C49" should read -- CIRCUIT NO. C49 --. Column 16, line 19, "if" should read -- , if --. Column 17, line 34, "vent" should read -- opens vent --. Column 18, line 29, "that" should read -- than --. Column 19, line 33, "lit in" should read -- lit on --; line 49, "cycles" should read -- cycle --. Column 20, line 44, "csontact" should read -- contact --; line 50, "posiion should read -- position --. Column 21, line 19, "cycle, earlier" should read -- cycle, as earlier --.

Signed and sealed this 2nd day of June 1970.

(SEAL)
Attest:

EDWARD M. FLETCHER, JR.
Attesting Officer

WILLIAM E. SCHUYLER, JR.
Commissioner of Patents